US011748732B2

(12) United States Patent
Kakino

(10) Patent No.: US 11,748,732 B2
(45) Date of Patent: Sep. 5, 2023

(54) TRANSACTION SYSTEM AND COMMODITY REGISTRATION MACHINE

(71) Applicant: TOSHIBA TEC KABUSHIKI KAISHA, Tokyo (JP)

(72) Inventor: Tomonari Kakino, Fuji Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 243 days.

(21) Appl. No.: 17/352,359

(22) Filed: Jun. 21, 2021

(65) Prior Publication Data

US 2021/0312416 A1    Oct. 7, 2021

Related U.S. Application Data

(63) Continuation of application No. 16/296,815, filed on Mar. 8, 2019, now Pat. No. 11,068,872.

(30) Foreign Application Priority Data

Apr. 16, 2018   (JP) .................................. 2018-078553

(51) Int. Cl.
  *G06Q 20/20* (2012.01)
  *G06K 7/14* (2006.01)

(52) U.S. Cl.
  CPC ......... *G06Q 20/208* (2013.01); *G06K 7/1413* (2013.01)

(58) Field of Classification Search
  CPC .......................... G06Q 20/208; G06K 7/1413
  See application file for complete search history.

(56) References Cited

U.S. PATENT DOCUMENTS

| 9,064,268 B2 | 6/2015 | Larrick et al. |
| 2016/0364925 A1* | 12/2016 | Kakino .................. A47F 9/047 |
| 2017/0228714 A1 | 8/2017 | Kakino |

FOREIGN PATENT DOCUMENTS

| JP | 2017-138920 A | 8/2017 |
| WO | 2016/136078 A1 | 9/2016 |

OTHER PUBLICATIONS

Notice of Reasons for Refusal dated May 10, 2022 in corresponding Japanese Patent Application No. 2018-078553, 6 pages (with Translation).
Notice of Reasons for Refusal dated Jan. 4, 2022 in corresponding Japanese Patent Application No. 2018-078553, 6 pages (with Translation).

* cited by examiner

*Primary Examiner* — Paul Danneman
(74) *Attorney, Agent, or Firm* — Kim & Stewart LLP

(57) ABSTRACT

A transaction system includes a commodity registration machine and a check-out machine. The commodity registration machine includes an input device and a processor. The processor determines whether or not whether or not a predetermined condition for permitting check-out processing at the commodity registration machine is satisfied. The processor enables the input device to accept selection of either one of the check-out processing at the commodity registration machine or the check-out processing at the check-out machine if it is determined that the predetermined condition is satisfied.

10 Claims, 8 Drawing Sheets

TRANSACTION SYSTEM AND COMMODITY REGISTRATION MACHINE

CROSS-REFERENCE TO RELATED APPLICATION

This application is a continuation of U.S. patent application Ser. No. 16/296,815, filed Mar. 8, 2019, which is based upon and claims the benefit of priority from the prior Japanese Patent Application No. 2018-078553, filed on Apr. 16, 2018, the entire contents of which are incorporated herein by reference.

FIELD

An embodiment described here generally relates to a transaction system and a commodity registration machine including the transaction system.

BACKGROUND

Conventionally, a check-out system for performing transaction processing of commodities is installed at a retailer such as a supermarket. In recent years, a semi-self service type (partial responsibility type) check-out system (semi-self check-out machine) is known. The check-out system includes a commodity registration machine that performs commodity registration and a check-out machine that performs commodity price settlement. In the case of the semi-self check-out machine, an employee (checker) operates the commodity registration machine and a shopper himself/herself operates the check-out machine. Specifically, in the case of the semi-self check-out machine, the checker finishes registering commodities in the commodity registration machine by operating the commodity registration machine, and then the shopper moves to the check-out machine and performs check-out processing for paying commodity prices.

However, in the case of the semi-self check-out machine, even for purchasing only one low-price commodity, it is necessary to perform check-out processing on the check-out machine after commodity registration is finished. Therefore, if many shoppers are waiting in front of the check-out machine, a shopper who wishes to purchase only one low-price commodity also needs to wait until the check-out machine becomes usable.

DETAILED DESCRIPTION

Figure 1:
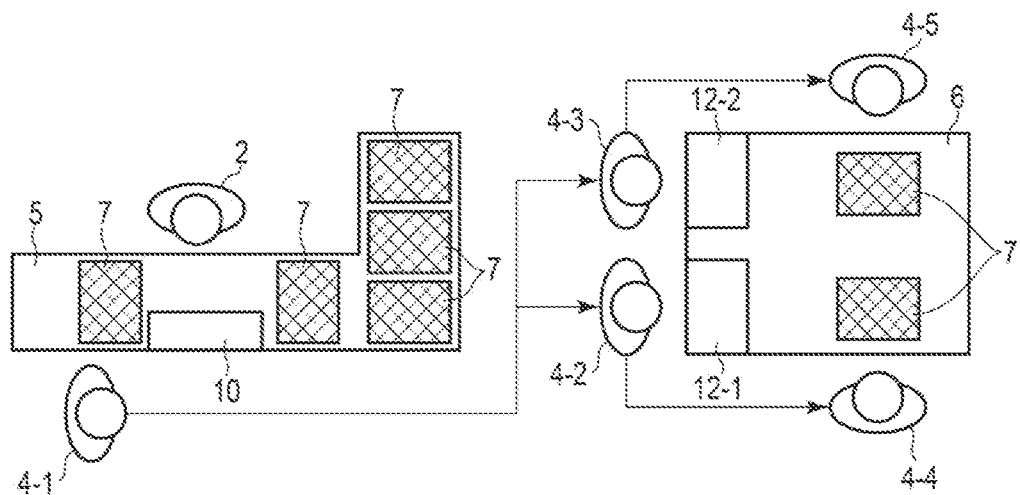
FIG. 1 is a diagram schematically showing a first arrangement example of equipment in a transaction system according to an embodiment.

In accordance with one embodiment, a transaction system includes a commodity registration machine and a check-out machine. The commodity registration machine performs registration processing of acquiring commodity determination information for determining a commodity, which is an object to be subjected to check-out processing in a commodity transaction, and generating registration information including data regarding the commodity according to the acquired commodity determination information for the check-out processing. The check-out machine performs check-out processing of the commodity on the basis of the registration information generated by the commodity registration machine. In the transaction system, the commodity registration machine includes a scanner, a first input device, a first communication device, and a first processor. The scanner reads the commodity determination information from the commodity for acquiring the commodity determination information. The first input device accepts an instruction to start the registration processing. The first communication device communicates with an external computer to be connected to be communicable with the check-out machine or the check-out machine. The first processor determines, after the instruction to start the registration processing is accepted, whether or not a predetermined condition for permitting the check-out processing at the commodity registration machine is satisfied. The first processor generates, after the instruction to start the registration processing is accepted, the registration information of the commodity according to the commodity determination information read by the scanner. The first processor enables the first input device to accept selection of either one of the check-out processing at the commodity registration machine or the check-out processing at the check-out machine if it is determined that the predetermined condition is satisfied. The first processor performs check-out processing on the basis of the generated registration information if the first input device accepts selection of the check-out processing at the commodity registration machine. Further, the first processor causes the first communication device to send the generated registration information to the external computer or the check-out machine if it is determined that the predetermined condition is not satisfied and if selection of the check-out processing at the check-out machine is accepted by the first input device. Further, in the transaction system, the check-out machine includes a second communication device, a second input device, and a second processor. The second communication device receives the registration information generated by the first processor. The second input device accepts an instruction to perform check-out processing with respect to the commodity. The second processor performs check-out processing on the basis of the registration information received by the second communication device if the second input device accepts the instruction to perform check-out processing.

Hereinafter, a transaction system according to this embodiment will be described with reference to the drawings. In the drawings, identical symbols denote identical or similar parts. The transaction system according to this embodiment is realized as a check-out system installed in a store such as a supermarket, for example. The transaction system according to this embodiment is a check-out system (semi-self check-out machine) of a partial responsibility type (semi-self service type), for example. The check-out system includes at least one commodity registration machine (commodity reader) and a plurality of check-out machines. Further, in the transaction system, the commodity registration machine and the plurality of check-out machines are connected to be communicable with an external computer, for example, a store computer (server) via a network.

Figure 2:
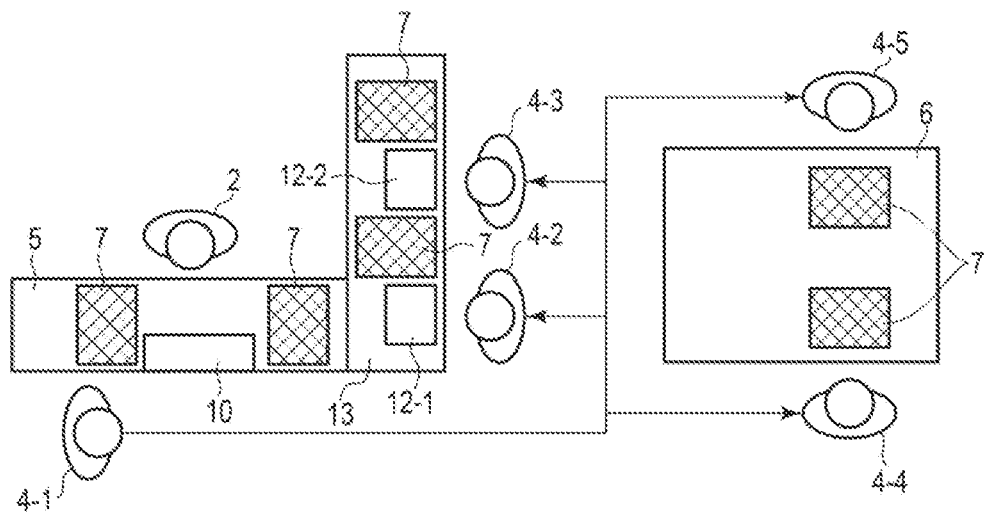
FIG. 2 is a diagram schematically showing a second arrangement example of the equipment in the transaction system according to the embodiment.

FIGS. 1 and 2 are plan views each showing an arrangement example between a commodity registration machine (commodity reader) and check-out machines in a transaction system (check-out system) according to this embodiment. FIG. 1 shows a first arrangement example in which one commodity registration machine 10 is disposed on a check-out counter 5 and two check-out machines 12 (12-1 and 12-2) are positioned apart from the commodity registration machine 10 disposed on the check-out counter 5. FIG. 2 shows a second arrangement example in which the one commodity registration machine 10 is disposed on the check-out counter 5 and the two check-out machines 12 (12-1 and 12-2) are positioned adjacent to the check-out counter 5.

In a commodity transaction, the commodity registration machine 10 is an apparatus for reading information (commodity determination information to be described later) regarding commodities which are objects to be subjected to check-out processing, i.e., commodities that a user (shopper) 4 (4-1) is going to purchase from those commodities and generating registration information to be described later on the basis of the read commodity determination information. It should be noted that in the following description, the processing from reading of the commodity determination information to generation of the registration information will be sometimes referred to as registration processing or simply registration. The commodity registration machine 10 performs commodity registration processing including processing of reading commodity determination information from a commodity by an operation made of an employee called checker 2. Further, the commodity registration machine 10 according to this embodiment is also capable of performing check-out processing including commodity price settlement based on commodity registration information by an operation (selection) made by a user himself/herself or the checker 2. That is, the commodity registration machine 10 according to this embodiment has a function of performing commodity registration processing and a function of performing check-out processing including the commodity price settlement.

It should be noted that in this embodiment, the commodity registration machine 10 performs check-out processing by performing commodity price settlement by electronic payment. Here, the electronic payment is cash-less check-out processing. For example, the electronic payment is check-out processing based on information read from a medium (card, portable terminal, or the like) owned by the user. Further, the electronic payment may be check-out processing based on biometric information of the user or authentication information such as information (user ID and password) input by the user.

The check-out machine 12 is an apparatus that acquires registration information generated by the commodity registration machine 10 and performs check-out processing on the basis of the acquired registration information. The check-out machine 12A is operated by a user 4 (4-2 or 4-3).

The check-out machine 12A performs check-out processing in accordance with the user's operation. It should be noted that the check-out machine 12 may perform check-out processing in accordance with an operation by a third person (e.g., staffs for check-out processing) other than the user.

The commodity registration machine 10 is mounted on the check-out counter 5. The check-out counter 5 includes an L-shaped top plate, for example. Commodities to be subjected to check-out processing, which are presented by the user 4-1, are placed on the check-out counter 5 directly or in a state in which the commodities are put in a basket 7. The checker 2 is constantly near the check-out counter 5. The checker 2 performs a scan operation of reading commodity determination information (operation of reading the commodity determination information) from the commodities placed on the check-out counter 5 by the user 4-1. Specifically, the checker 2 performs scan operation by using a scanner 25 (see FIG. 4) of the commodity registration machine 10.

In the transaction system according to this embodiment, the user can select the check-out processing at the commodity registration machine 10 if a predetermined condition to be described later is satisfied. For example, the commodity registration machine 10 is put in a state in which the check-out processing at the commodity registration machine 10 is selectable if the predetermined condition to be described later is satisfied. When the user selects the check-out processing at the commodity registration machine 10, the commodity registration machine 10 itself performs check-out processing. In a case where the check-out processing at the commodity registration machine 10 is not selected, the check-out machine 12 performs check-out processing on the commodities registered by the commodity registration machine 10. The case where the check-out processing at the commodity registration machine 10 is not selected includes a case where the predetermined condition to be described later is not satisfied and a case where the check-out processing at the check-out machine 12 is selected.

In the arrangement example shown in FIG. 1, the two check-out machines 12-1 and 12-2 are disposed on a sacker counter 6 positioned apart from the check-out counter 5 on which the commodity registration machine 10 is mounted. In the arrangement example shown in FIG. 1, in a case where the check-out processing is performed at the check-out machines 12, the checker 2 places the basket 7 including the commodities (or only the commodities) subjected to registration processing at a position such that the user who will move to the check-out machines 12 easily carries the basket 7. The user carries the basket 7 including the commodities subjected to registration processing and moves to the check-out machines 12-1 and 12-2 capable of performing check-out processing. The user moves to the check-out machine 12 and then operates the check-out machine 12. The check-out machine 12 performs check-out processing on the commodities registered by the commodity registration machine 10 in accordance with a user's operation.

Further, in the arrangement example shown in FIG. 2, the two check-out machines 12-1 and 12-2 are disposed on a check-out processing counter 13 arranged adjacent to the check-out counter 5 on which the commodity registration machine 10 is mounted. In the arrangement example shown in FIG. 2, the checker 2 specifies either one of the two check-out machine 12-1 or 12-2 disposed on the check-out processing counter 13 adjacent to the check-out counter 5. Then, the checker 2 informs the user of the check-out processing at the specified check-out machine 12. Along with this, the checker 2 places the basket 7 including the commodities subjected to registration processing beside the specified check-out machine 12. The user moves the check-out machine 12 (neighbor check-out machine on which the basket 7 is placed) specified by the checker 2 and performs a check-out processing operation.

It should be noted that although each of the arrangement examples shown in FIGS. 1 and 2 is an example in which two check-out machines are arranged for one commodity registration machine, three or more check-out machines 12 may be arranged for one commodity registration machine. Further, as long as a practical configuration in which the registration processing and the check-out processing are associated with each other by using a transaction ID to be described later is provided, the number of combinations of the commodity registration machine 10 with the check-out machines 12 may be unspecified. That is, any of the check-out machines 12 may be capable of performing check-out processing on registration information generated by each commodity registration machine 10.

Figure 3:
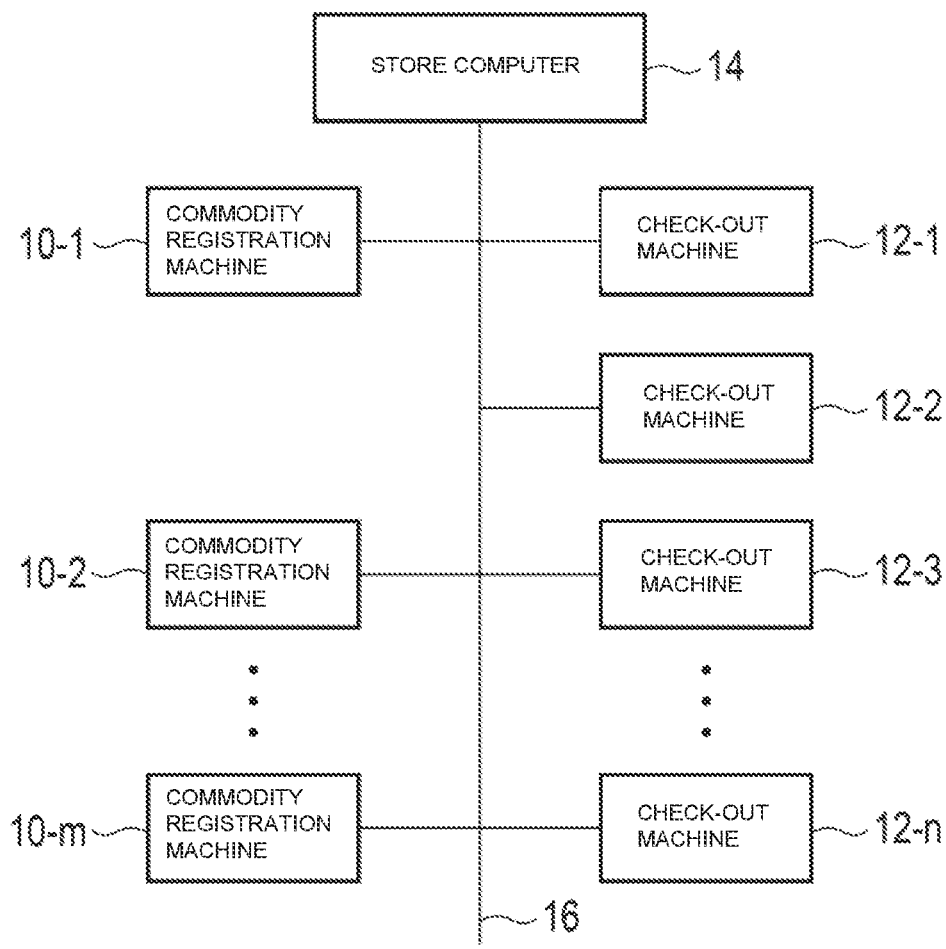
FIG. 3 is a block diagram showing a configuration example of the transaction system according to the embodiment.

FIG. 3 is a block diagram showing a configuration example of an entire transaction system (semi-self check-out machine) according to this embodiment. The configuration example shown in FIG. 3 is an example in which a plurality of (m) commodity registration machines 10-1, . . . , 10-m and a plurality of (n) check-out machines 12-1 and 12-n are provided. For example, as shown in FIGS. 1 and 2, in an example in which two check-out machines are arranged for each commodity registration machine, the number of (n) check-out machines is two times (n=2 m) as large as the number of (m) commodity registration machines. The commodity registration machines 10-1, . . . , 10-m, the check-out machines 12-1 and 12-n, and a store computer (server) 14 are connected via a network 16 such as a local area network (LAN) and are capable of transmitting/receiving data to/from each other.

The store computer 14 manages all the commodity registration machines 10 and check-out machines 12 included in the transaction system. The store computer 14 communicates with the commodity registration machines 10 and the check-out machines 12 via a network, for example. The store computer 14 receives registration information generated by the commodity registration machines 10 (10-1, . . . , 10-m). The store computer 14 includes a storage device and saves registration information, which is received from the commodity registration machine 10, in the storage device. The store computer 14 sends the registration information, which is stored in the storage device, to the check-out machine 12 that performs check-out processing based on that registration information. Further, the store computer 14 may save information indicating the processing contents of the commodity registration machine 10 and each check-out machine 12.

It should be noted that in the arrangement example shown in FIG. 2, a configuration in which the one commodity registration machine 10 and the two check-out machines 12 corresponding to the commodity registration machine 10 are directly connected to each other may be employed. In this case, the commodity registration machine 10 may send the registration information to either one of the corresponding two check-out machines 12, which is specified by the checker 2. That is, the commodity registration machine 10 accepts the specification of the either one of the two check-out machines 12. The commodity registration machine 10 sends the registration information to the check-out machine 12 the specification of which is accepted. It should be noted that the specification of the check-out machine 12 is accepted by a keyboard 26 or a touch panel 27, for example.

Figure 4:
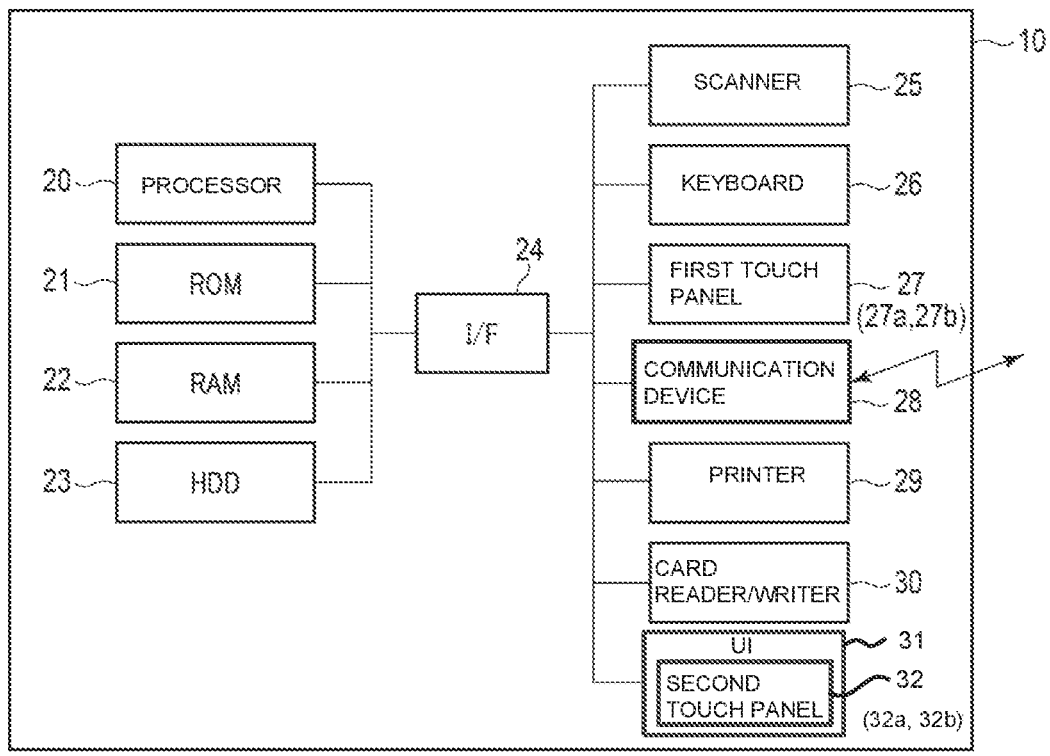
FIG. 4 is a block diagram showing a configuration example of a commodity registration machine in the transaction system according to the embodiment.

FIG. 4 is a block diagram showing a configuration example of the commodity registration machines 10 (10-1, . . . , 10-m) according to this embodiment. The commodity registration machine 10 includes a processor 20, a read-only memory (ROM) 21, a random-access memory (RAM) 22, a hard disk device (hard disk drive (HDD)) 23, an interface (I/F) device 24, the scanner 25, the keyboard 26, the first touch panel 27, a communication device 28, a printer 29, and a card reader/writer 30.

The processor 20 is a central processing unit (CPU), for example. The processor 20 realizes various types of processing functions by executing programs. For example, the processor 20 loads programs (operating system, middleware, and application program) stored in the ROM 21 or the HDD 23, into the RAM 22, for example, and executes the programs. The processor 20 controls respective units in order to realize various operations as the commodity registration machine 10 by executing programs.

The ROM 21 is a nonvolatile memory. The ROM 21 stores various programs executed by the processor 20. The ROM 21 stores data to be referred to for the processor 20 to perform various types of processing as well as the programs.

The RAM 22 is a volatile memory. The RAM 22 functions as a working memory. For example, in a case where the commodity registration processing is performed, the RAM 22 stores a registration information list in which the transaction ID and the registration information are associated with each other. The transaction ID is data issued for each user who purchases a commodity (performs transaction). The transaction ID will be described later in detail. The registration information is generated on the basis of the commodity determination information to be described later, which is read from each commodity via the scanner 25.

The HDD 23 is a rewritable nonvolatile memory. The HDD 23 is an auxiliary recording portion for the commodity registration machine 10. The HDD 23 saves data to be used for the processor 20 to perform various types of processing or data generated by processing of the processor 20. It should be noted that a solid state drive (SSD) and the like, for example, can also be used instead of the HDD 23.

The programs executed by the processor 20 are stored in the ROM 21 or the HDD 23. The programs executed by the processor 20 include a program for performing processing of inputting the commodity determination information (commodity code and the like) to be described later. Moreover, the programs executed by the processor 20 include a program for performing processing of generating the registration information to be used for check-out processing depending on the commodity determination information. Moreover, the programs executed by the processor 20 include a program for performing processing of determining identification information (transaction ID) for identifying one transaction (typically, purchase of the commodity by one user). Moreover, the programs executed by the processor 20 include a program for performing processing for determining whether to accept the check-out processing at the commodity registration machine. Moreover, the programs executed by the processor 20 include a program for performing processing for accepting the check-out processing. Moreover, the programs executed by the processor 20 include a program for performing check-out processing based on the registration information. Moreover, the programs executed by the processor 20 include a program for performing processing and the like of sending the registration information to the store computer 14 for recording the registration information.

The I/F (interface) unit 24 transmits data exchanged between the processor 20, the ROM 21, the RAM 22, the HDD 23, the scanner 25, the communication device 28, the first touch panel 27, the printer 29, and the card reader/writer 30. The I/F device 24 is, for example, a well-known device including various buses such as a system bus and various interface circuits that connect those buses to the respective units.

The scanner 25 is an information acquisition unit. The scanner 25 scans a commodity and reads commodity determination information for determining the commodity. The commodity determination information is a code symbol attached to the commodity, for example. The code symbol is a barcode or the like, for example. That is, the scanner 25 reads the commodity determination information such as the barcode and inputs the commodity code specific to the commodity. That is, the commodity determination information such as the barcode includes information indicating the commodity code. The scanner 25 may be a stationary or handy two-dimensional-code scanner. The scanner 25 may be a scanner of a type that identifies a commodity by using an image recognition technique based on an image obtained by photographing the commodity. Further, the scanners 25 of the commodity registration machines 10 may be scanners of the same type. Further, the scanners 25 of the commodity registration machines 10 may be scanners of different types.

The keyboard 26 is an input device. The keyboard 26 includes various keys that receive an operation of the checker 2 and input information. For example, the keyboard 26 includes number keys, operator keys, keys for inputting various commands, commodity keys, and the like. For example, the number keys are keys for inputting amounts. The operator keys are keys for instructing to perform operations including the sub-total, the total, and the like. The keys for inputting various commands and the commodity keys include a plurality of key groups for which a plurality of commodities are assigned. The keyboard 26 outputs a command corresponding to an operation made by the checker 2 on the respective keys.

The first touch panel 27 receives an operation of the checker 2 and inputs information. Moreover, the first touch panel 27 displays the information in order to inform the checker 2 of information. The first touch panel 27 is installed in a main body of the commodity registration machine 10 provided in the check-out counter 5 while the first touch panel 27 is directed to the checker 2. The first touch panel 27 includes a display device 27a and a touch sensor 27b.

The display device 27a displays an arbitrary screen such as a graphical user interface (GUI) screen. For example, the display device 27a displays a list of registration information (commodity name, amount, and the like) regarding the commodities registered as objects to be purchased, a sub-total amount, various menus, and buttons for inputting commands, and the like. A well-known device such as a color liquid crystal display (LCD), for example, can be used as the display device 27a.

The touch sensor 27b is an input device. The touch sensor 27b is arranged, overlaid on a display screen of the display device. The touch sensor 27b detects an operator's touch position on the display screen of the display device. The touch sensor 27b sends information regarding that touch position to the processor 20. A well-known device can be used as the touch sensor 27b.

The communication device 28 communicates with the store computer 14 (external computer) and the check-out machines 12 via a LAN 13. The printer 29 is a thermal printer, a dot impact printer, or the like, for example. The printer 29 issues a receipt and the like by printing various literal character strings, images, code patterns (two-dimensional codes and the like), and the like on a receipt sheet.

The card reader/writer 30 reads data recorded on a medium (card or portable terminal having a function equivalent to that of the card) and writes the data on the medium. The medium is a payment card (or a portable terminal having a function equivalent to that of the card). The payment card includes a credit card, a debit card, an electronic money card, a prepaid card, and the like, for example. Further, the medium may include various cards that record information related to the check-out processing, such as a members card and a loyalty card (or portable terminals having functions equivalent to those of the cards). The card reader/writer 30 may be any of a magnetic device, a contact device, and a contactless device. Moreover, the card reader/writer 30 may include a plurality of types of devices.

A user interface (UI) 31 receives a user's operation and inputs information. Moreover, the user interface 31 displays the information in order to inform the user of the information. The user interface 31 includes a second touch panel 32. The second touch panel 32 is installed, directed to the user. The second touch panel 32 includes a display device 32a and a touch sensor 32b.

The display device 32a displays an arbitrary screen such as a graphical user interface (GUI) screen. For example, the display device 32a displays buttons and the like for inputting a list, a sub-total amount, various menus, and commands of registration information (commodity names, amounts, and the like) related to the commodities registered as the objects to be purchased. A well-known device such as a color liquid crystal display (LCD), for example, can be used as the display device 32a.

The touch sensor 32b is an input device. The touch sensor 32b is arranged, overlaid on the display screen of the display device 32a. The touch sensor 32b detects an operator's touch position on the display screen of the display device 32a. The touch sensor 32b sends the touch position information to the processor 20. A well-known device can be used as the touch sensor 32b.

Figure 5:
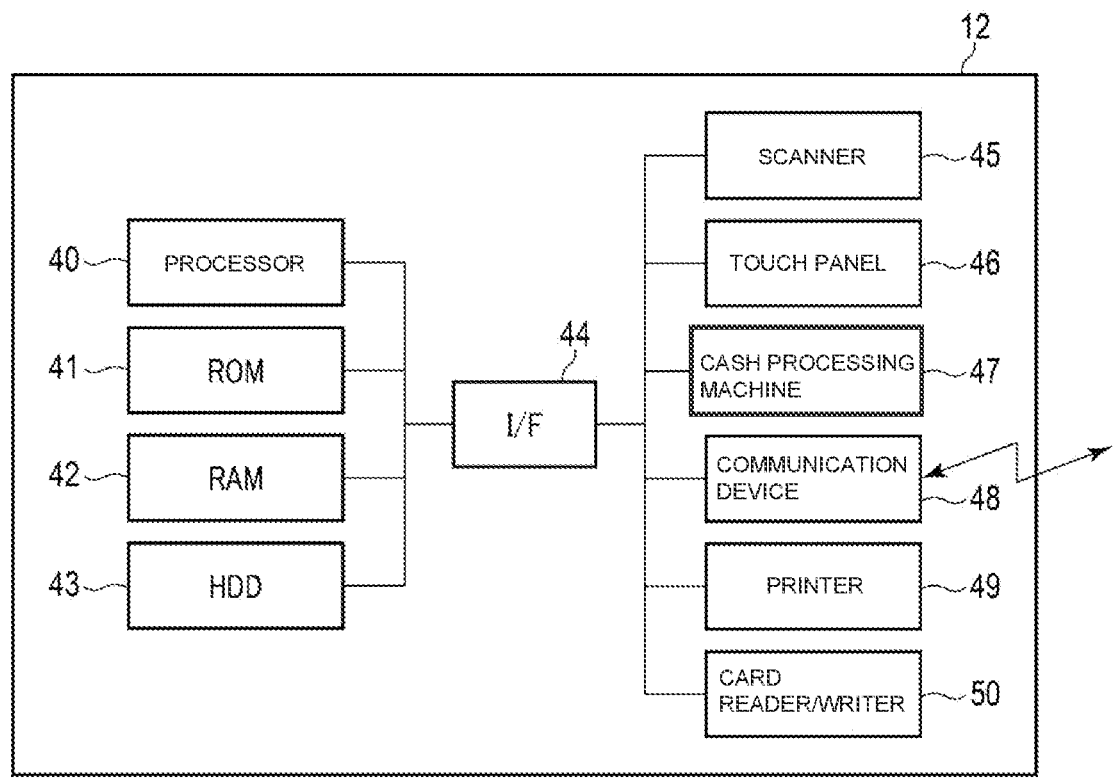
FIG. 5 is a block diagram showing a configuration example of a check-out machine in the transaction system according to the embodiment.

FIG. 5 is a block diagram showing a configuration example of the check-out machine 12 (12-1, . . . , 12-n) according to this embodiment. The check-out machine 12 includes a processor 40, a ROM 41, a RAM 42, an HDD 43, an interface (I/F) device 44, a scanner 45, a touch panel 46, a cash processing machine 47, a communication device 48, a printer 49, and a card reader/writer 50.

The processor 40 is a central processing unit (CPU), for example. The processor 40 realizes various types of processing functions by executing programs. For example, the processor 40 executes programs by loading programs (operating system, middleware, and application program), which are stored in the ROM 21 or the HDD 23 into the RAM 22, for example, by using the RAM 22. The processor 40 controls respective units in order to realize various operations as the check-out machine 12 by executing programs.

The ROM 41 is a nonvolatile memory. The ROM 41 stores various programs executed by the processor 40. The ROM 41 also stores data and the like to be referred to for the processor 40 to perform various types of processing as well as the programs.

The RAM 42 is a volatile memory. The RAM 42 functions as a working memory. For example, in a case where processing of registering information on a commodity is performed, the RAM 42 stores a registration information list in which the transaction ID and the registration information are associated with each other. The transaction ID is data issued for each user who purchases a commodity (performs transaction). The transaction ID will be described later in detail. The registration information is generated on the basis of information read from each commodity in the registration processing.

The HDD 43 is a rewritable nonvolatile memory. The HDD 43 is an auxiliary recording portion for the computer. The HDD 43 saves data to be used for the processor 40 to perform various types of processing or data generated by processing of the processor 40. It should be noted that an SSD and the like, for example, can also be used instead of the HDD 43.

The programs executed by the processor 40 is stored in the ROM 41 or the HDD 43. The programs executed by the processor 40 include programs for performing various types of processing. For example, the programs executed by the processor 40 include a program for performing check-out processing based on the registration information. It should be noted that the registration information is generated by the registration processing in the commodity registration machine 10 and is received by the check-out machine 12. By the check-out machine 12 being operated by the user, the check-out processing is performed on the basis of the registration information.

The interface (I/F) device 44 transmits data exchanged between the processor 40, the ROM 41, the RAM 42, the HDD 43, the scanner 45, the touch panel 46, the cash processing machine 47, the communication device 48, the printer 49, and the card reader/writer 50. The interface (I/F) device 44 is a well-known device including various buses such as a system bus and various interface circuits that connect those buses to the respective units.

The scanner 45 reads information by optical scan and inputs a code. For example, the scanner 45 is used for reading the transaction ID such as the code (e.g., two-dimensional code) printed on the receipt by the printer 29 of the commodity registration machine 10. The receipt is issued by the commodity registration machine 10. A code symbol (e.g., two-dimensional code) indicating identification information (transaction ID) for identifying one transaction (one user) is printed on the receipt. The scanner 45 may be a stationary or handy two-dimensional-code scanner. Moreover, the scanner 45 may be a scanner of a type that identifies a commodity by using an image recognition technique based on an image obtained by photographing the commodity. Further, the scanner 45 of each check-out machine 12 may be a scanner of a common single type. Further, the scanner 45 of each check-out machine 12 may be scanners of a plurality of different types.

The touch panel 46 includes the display device and the touch sensor. The display device displays an arbitrary screen such as a GUI screen. For example, the display device of the touch panel 46 displays buttons and the like for inputting a list, a sub-total amount, various menus, and commands of registration information (commodity names, amounts, and the like) related to the commodities registered as the objects to be purchased. A well-known device such as a color liquid crystal display (LCD), for example, can be used as the display device. The touch sensor of the touch panel 46 is arranged, overlaid on the display screen of the display device. The touch sensor detects an operator's touch position on the display screen of the display device. The touch sensor sends information regarding that touch position to the processor 40. A well-known device can be used as the touch sensor.

The cash processing machine 47 processes cash. The cash processing machine 47 inspects and receives inserted coin(s) and/or bill(s). Further, the cash processing machine 47 discharges coin(s) and/or bill(s) as change. The communication device 48 communicates with the store computer 14 and the commodity registration machine 10 via the LAN 13. The printer 49 is a thermal printer, a dot impact printer, or the like, for example. The printer 49 prints various literal character strings, images, or the like on a receipt sheet. The printer 49 issues the receipt or the like on which information indicating the contents of the check-out processing is printed.

The card reader/writer 50 reads data from the medium (a card or an electronic device having a communication function equivalent to that of the card) and writes the data on the medium. The medium is a payment card. The payment card includes a credit card, a debit card, an electronic money card, a prepaid card, and the like. Further, the medium may include various cards that record information related to the check-out processing, such as a members card and a loyalty card. The card reader/writer 30 may be any of a magnetic device, a contact device, and a contactless device. Moreover, the card reader/writer 30 may include a plurality of types of devices. It should be noted that the check-out machine 12 may be provided with a motion sensor capable of detecting approach of the user 4 and the like.

Figure 6:
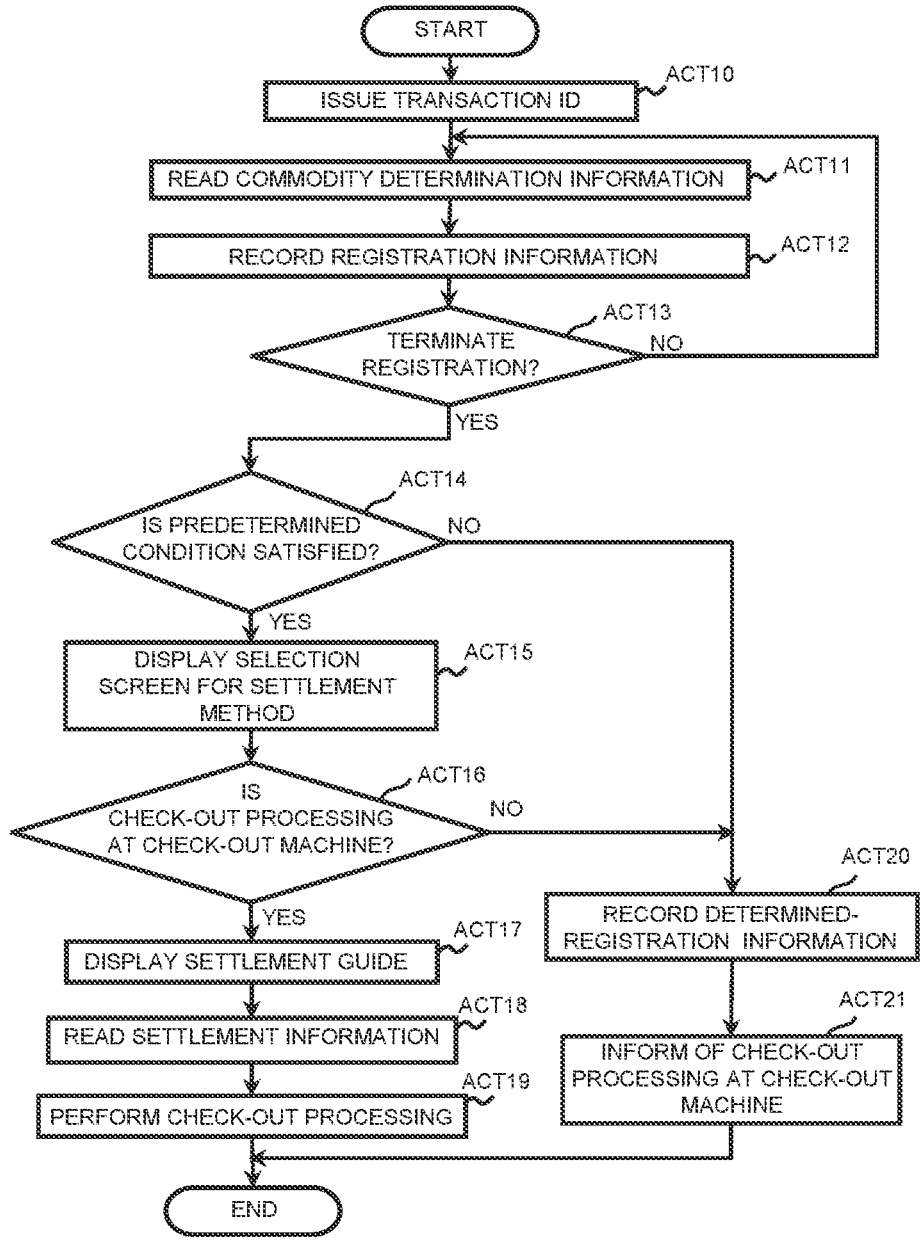
FIG. 6 is a flowchart showing a first operation example of the commodity registration machine in the transaction system according to the embodiment.

Next, an operation of the transaction system according to this embodiment will be described. First of all, the operation of the commodity registration machine 10 will be described. FIG. 6 is a flowchart showing a first operation example of the commodity registration machine 10 according to this embodiment. In this transaction system, the user approaches the check-out counter 5, carrying the commodities which are the objects to be subjected to check-out processing. The user may place the commodities directly on the check-out counter 5 or may place the commodities put in the basket 7 on the check-out counter 5. Further, the user may ask the checker 2 to perform registration processing in a state in which the commodities are put in a cart or the like. When the user 4 carrying the commodities which are the objects to be subjected to check-out processing appears, the checker 2 makes an instruction to start commodity registration processing by using the first touch panel 27 or the keyboard 26. That is, the first touch panel 27 or the keyboard 26 is an input device that detects the instruction to start the commodity registration processing and accepts the instruction to start the commodity registration processing.

First of all, when the instruction to start the commodity registration processing is accepted by the first touch panel 27 or the keyboard 26, in ACT10 of FIG. 6, the processor 20 of the commodity registration machine 10 issues transaction identification data specific to the commodity transaction at this time (hereinafter, referred to as the transaction ID) after the instruction to start the registration processing is accepted. The transaction ID is information for managing a series of commodity transaction processing from the commodity reading (registration processing) to the check-out processing. The processor 20 generates a transaction ID in accordance with an algorithm for preventing the transaction ID from being identical to transaction IDs issued by other commodity registration machines 10.

For example, the transaction ID may be issued on the basis of information acquired from the recording medium such as the members card owned by the user 4. Moreover, the transaction ID may be issued as a unique ID for each transaction.

It should be noted that the processor 20 may detect the instruction to start the commodity registration in accordance with a user's operation. For example, the processor 20 detects the instruction to start the commodity registration in accordance with the operation from the user himself/herself through the second touch panel 32, the keyboard, or the like provided in the user interface 31. In this case, the processor 20 may issue the transaction ID in accordance with the instruction to start the commodity registration from the user himself/herself.

Further, the transaction ID may be issued after reading processing of the commodity determination information to be described later is started (before the commodity registration processing is terminated). For example, the processing in ACT10 may be performed while the processing in ACT11 to ACT14 is performed or after NO determination is made in ACT14.

When issuing the transaction ID for managing the transaction with the user, the processor 20 stores the transaction ID in the registration information list provided in the RAM 22 or the like. The registration information list is a table that stores the registration information including data regarding the registered commodity in association with the transaction ID. It should be noted that the registration information may be sent from the commodity registration machine 10 to the store computer 14 and may be recorded in the storage device in the store computer 14.

Further, after issuing the transaction ID, the processor 20 acquires the commodity determination information such as the barcode from the commodities which are the objects to be subjected to check-out processing by using the scanner 25 in ACT11. For example, the scanner 25 reads the commodity determination information such as a barcode printed on a commodity which is an object to be subjected to check-out processing by an operation made of the checker 2. The scanner 25 outputs the commodity determination information, which is read from the commodity, to the processor 20. With this, the processor 20 acquires the commodity determination information from the scanner 25.

When the commodity determination information is acquired, the processor 20 acquires data (commodity name, fixed price, other data) regarding a commodity determined on the basis of the commodity determination information from the store computer 14. When acquiring the data regarding the commodity, the processor 20 generates registration information (commodity names, amounts, and the like) including the acquired data regarding the commodity as the information to be used in the check-out processing. When generating the registration information, the processor 20 records (registers) the generated registration information together with the information regarding the sub-total amount and the like in the registration information list in ACT12. When recording the registration information in the registration information list, the processor 20 displays, on the first touch panel 27, information indicating a list of the commodities stored in the registration information list. Further, the processor 20 may display the information indicating the list of the commodities on the second touch panel 32. The second touch panel 32 is installed, directed to the user.

The checker 2 performs a scan operation of the commodity by using the scanner 45 for registering the commodity which is the object to be subjected to check-out processing. That is, by using the scanner 45, the checker 2 performs a scan operation for reading the commodity determination information with respect to each of all the commodities which are the objects to be subjected to check-out processing. For example, if the basket 7 is placed on the check-out counter 5, the checker 2 repeatedly performs a scan operation by using the scanner 45 with respect to each of the commodities inside the basket 7 on the check-out counter 5. In ACT13, the processor 20 detects whether or not an instruction to terminate the commodity registration is made. The processor 20 repeatedly performs processing in ACT11 to ACT12 with respect to the scan operation of the checker 2 until the instruction to terminate the commodity registration is made (NO in ACT13). With this, the registration information of all the commodities which are the objects to be subjected to check-out processing is stored in the registration information list in association with the transaction ID.

When the scan operation with respect to all the commodities is finished, the checker 2 instructs the commodity registration machine 10 to terminate a registration operation by the operation with respect to the keyboard 26 or the first touch panel 27 (e.g., operation on a total key). The processor 20 detects that the instruction to terminate the commodity registration is made via the keyboard 26 or the first touch panel 27 (YES in ACT13), the processing of the processor 20 proceeds to ACT14. In ACT14, the processor 20 determines whether or not the predetermined condition for permitting the check-out processing at the commodity registration machine is satisfied. In other words, the processor 20 determines whether or not the check-out processing at the commodity registration machine 10 is selectable with respect to this transaction. That is, on the basis of a preset predetermined condition, the processor 20 determines whether or not the check-out processing at the commodity registration machine 10 is possible.

In this embodiment, whether or not to permit the check-out processing at the commodity registration machine 10, i.e., whether or not the check-out processing at the commodity registration machine 10 is possible is set in accordance with the practical configuration of the commodity registration machine 10, for example. That is, the predetermined condition for permitting the check-out processing at the commodity registration machine 10, in other words, the predetermined condition for determining whether or not the check-out processing at the commodity registration machine 10 is possible may be set in accordance with the practical configuration. Hereinafter, a setting example of the predetermined condition for permitting the check-out processing at the commodity registration machine 10 (predetermined condition for determining whether or not the check-out processing is possible) will be exemplified.

As a first example, with respect to a transaction having a small number of commodities, the processor 20 of the commodity registration machine 10 may determine whether or not the check-out processing at the commodity registration machine 10 is selectable. For example, if a threshold (number) is set with respect to the number of commodities as the predetermined condition, the processor 20 is capable of determining whether or not the check-out processing at the commodity registration machine 10 is possible on the basis of the number of commodities for each transaction. In this case, the processor 20 determines to permit the check-out processing at the commodity registration machine 10 if the number of commodities is smaller than a predetermined number of commodities (predetermined condition). In other words, if the number of commodities is smaller than a predetermined number of commodities (predetermined condition), the processor 20 determines that the check-out processing at the commodity registration machine 10 is selectable.

Moreover, as a second example, the processor 20 of the commodity registration machine 10 may determine whether or not the check-out processing at the commodity registration machine 10 is selectable with respect to a transaction in which a settlement amount (payment) for all commodities is small. For example, if a threshold (amount) to the payment is set as the predetermined condition, the processor 20 is capable of determining whether or not the check-out processing at the commodity registration machine 10 is possible on the basis of a payment for each transaction (total amount of commodity prices). In this case, the processor 20 determines to permit the check-out processing at the commodity registration machine 10 if the payment is smaller than a predetermined amount (predetermined condition). In other words, if the payment is smaller than a predetermined amount (predetermined condition), the processor 20 determines that the check-out processing at the commodity registration machine 10 is selectable.

Moreover, as a third example, the processor 20 of the commodity registration machine 10 may determine whether or not the check-out processing at the commodity registration machine 10 is selectable in accordance with the kinds of the registered commodities. For example, if the kinds of the commodities, for which the check-out processing at the commodity registration machine 10 can be permitted, are set as the predetermined condition, the processor 20 is capable of determining whether or not the check-out processing at the commodity registration machine 10 is possible in accordance with the kinds of the commodities. In this case, the processor 20 determines to permit the check-out processing at the commodity registration machine 10 if the kinds of the commodities are predetermined kinds (predetermined condition). In other words, if the kinds of the commodities are the predetermined kinds (predetermined condition), the processor 20 determines that the check-out processing at the commodity registration machine 10 is selectable.

Moreover, as a fourth example, the processor 20 of the commodity registration machine 10 may determine whether or not the check-out processing at the commodity registration machine 10 is selectable in accordance with a situation of the check-out processing at the two check-out machines 12 corresponding to the commodity registration machine 10. In this case, if the corresponding two check-out machines 12 are performing check-out processing, the processor 20 determines that the predetermined condition is satisfied and determines to permit the check-out processing. In other words, if the corresponding two check-out machines 12 are performing check-out processing, the processor 20 determines that the check-out processing at the commodity registration machine 10 is selectable.

Moreover, as a fifth example, the processor 20 of the commodity registration machine 10 may determine whether or not the check-out processing at the commodity registration machine 10 is selectable on the basis of a time zone, a period, or the like. In this case, the processor 20 determines whether or not the check-out processing at the commodity registration machine 10 is possible on the basis of whether or not current date and time are included in a time zone or period in which the check-out processing at the commodity registration machine 10 can be permitted.

Furthermore, as a sixth example, the processor 20 of the commodity registration machine 10 may determine whether or not the check-out processing at the commodity registration machine 10 is selectable by an operation made by the checker 2. For example, when an instruction to permit the check-out processing at the commodity registration machine 10 is made via the first touch panel 27 or the keyboard 26, the processor 20 may determine that the check-out processing at the commodity registration machine 10 is selectable.

In ACT14, if the processor 20 determines that regarding this transaction, the check-out processing at the commodity registration machine 10 is not selectable (NO in ACT14), i.e., if it is determined that, regarding this transaction, the check-out processing at the commodity registration machine 10 is not permitted (is not accepted), the processor 20 determines to perform check-out processing at the check-out machine 12. Then, the processing of the processor 20 proceeds to ACT20. In ACT20, the processor 20 generates registration information determined when the registration processing is finished (hereinafter, sometimes referred to as determined-registration information) and stores it in the storage device to be described later. The determined-registration information is information including the registration information of all the commodities registered in association with the transaction ID. The determined-registration information is information which is an object to be subjected to check-out processing of the check-out machine 12. In this embodiment, the determined-registration information is stored in the storage device of the store computer 14. In this case, the processor 20 stores the determined-registration information in the storage device of the store computer 14.

It should be noted that the storage device that stores the determined-registration information may be any storage device as long as the check-out machine 12 is capable of accessing the storage device. For example, the determined-registration information may be stored in the storage device (the RAM 42, the HDD 43) of the check-out machine 12 capable of performing check-out processing. In the arrangement example shown in FIG. 2, if the checker 2 specifies the check-out machine 12 that performs check-out processing, the determined-registration information may be stored in the storage device (the RAM 42, the HDD 43) of the specified check-out machine 12. Further, in this embodiment, for example, the check-out machine 12 capable of performing check-out processing is capable of accessing the commodity registration machine 10. Thus, the determined-registration information may be stored in the storage device (the RAM 42, the HDD 43) of the commodity registration machine 10.

When the determined-registration information is recorded in the above-mentioned manner (ACT20), the processor 20 informs the user of a guide of the check-out processing at the check-out machine 12 in ACT21. For example, the processor 20 displays, on the second touch panel 32, the transaction ID, the payment, the guide indicating the check-out machine 12 capable of performing check-out processing, and the like. Further, the processor 20 may output a receipt sheet on which the information including the transaction ID (two-dimensional code, literal character strings, and the like) is printed by the use of the printer 29.

On the other hand, if the processor 20 determines that regarding this transaction, the check-out processing at the commodity registration machine 10 is selectable (YES in ACT14), i.e., determines to permit (accept) the accounting by the commodity registration machine 10 regarding this transaction, the processing of the processor 20 proceeds to ACT15. In ACT15, the processor 20 displays, on the second touch panel 32, a selection screen for a settlement method at the commodity registration machine 10. For example, the selection screen (settlement selection screen) for the settlement method to be displayed is a settlement selection screen for the user to select one of a plurality of selectable settlement methods. That is, the processor 20 displays the plurality of settlement methods to be selectable in the settlement selection screen on the second touch panel 32. Further, the processor 20 also displays an instruction key for selecting the check-out processing at the check-out machine 12 in the settlement selection screen on the second touch panel 32.

If the user wishes to perform check-out processing at the commodity registration machine 10, the user selects a desired settlement method from the settlement selection screen displayed on the second touch panel 32. In the settlement selection screen, the settlement method that can be used for the commodity price settlement is displayed in association with the instruction key as the check-out processing at the commodity registration machine 10. Further, the processor 20 may display the settlement selection screen on the first touch panel 27 and the checker 2 may specify the settlement method in accordance with a user's intention.

The settlement method used in the check-out processing at the commodity registration machine 10 may be limited to the electronic payment based on the medium (card, portable terminal, or the like) owned by the user. Further, the settlement method used in the check-out processing at the commodity registration machine 10 may be limited to the electronic payment based on a user's authentication result (biometrics authentication or the like). There are a plurality of types of electronic payment. Therefore, the processor 20 may display types of usable electronic payment as a list on the settlement selection screen and perform check-out processing by using electronic payment selected from the list. The electronic payment can be realized by a small device such as a card reader and is capable of performing settlement processing easily and speedily without cash exchange. Thus, the check-out processing at the commodity registration machine 10 can be rapidly performed in such a manner that the check-out processing at the commodity registration machine 10 is limited to the electronic payment. Therefore, smooth operation of the entire transaction system can be realized.

Next, in ACT16, the processor 20 determines whether or not the check-out processing at the check-out machine 12 is selected via the settlement selection screen. If the check-out processing at the commodity registration machine 10 is not selected via the settlement selection screen (NO in ACT16), in other words, if the check-out processing at the check-out machine 12 is selected, the processing of the processor 20 proceeds to ACT20. In ACT20, the processor 20 records the determined-registration information in the check-out machine 12 as described above in order to perform check-out processing. In addition, in ACT21, the processor 20 informs the user of the guide of the check-out processing of the check-out machine 12 as described above. Further, if one of the settlement methods to be used for check-out processing at the commodity registration machine 10 is selected via the settlement selection screen (YES in ACT16), the processing of the processor 20 proceeds to ACT17. In ACT17, the processor 20 displays the guide of the check-out processing according to the selected settlement method on the second touch panel 32. For example, if settlement by certain electronic money is selected, the processor 20 displays a guide indicating that an IC card (or a portable terminal) having a function of the selected electronic money is presented to the reader on the second touch panel 32. Further, the processor 20 may display a method of presenting to the reader, the payment, and the like on the second touch panel 32.

When displaying the settlement guide on the second touch panel 32, the processor 20 causes, in ACT18, the card reader/writer 30 to read the information (electronic payment information) for performing electronic payment from a medium presented by the user. When the electronic payment information is read by the card reader/writer 30 from the medium presented by the user, the processing of the processor 20 proceeds to ACT19. In ACT19, the processor 20 performs check-out processing by electronic payment based on the read electronic payment information and the payment for the registered commodity. For example, in accordance with settlement by prepaid electronic money, the processor 20 performs settlement by subtracting the payment for this transaction from remaining-amount information read from the medium presented by the user.

It should be noted that for performing electronic payment by using the biometrics authentication or the like, the commodity registration machine 10 may include a biometric information acquisition device (camera, scanner, or the like) that acquires the biometric information of the user. In this case, the processor 20 performs electronic payment if biometrics authentication between the biometric information acquired by the biometric information acquisition device and the biometric information stored in the card presented by the user succeeds. Further, the processor 20 may perform electronic payment if biometrics authentication between the biometric information acquired by the biometric information acquisition device and biometric information of a registered person registered in a server or the like succeeds.

If the settlement of the payment is normally terminated by the electronic payment, the processor 20 causes the printer 49 to output a receipt on which a settlement result is printed and terminates the check-out processing with respect to this transaction. When the check-out processing at the commodity registration machine 10 is normally terminated, the processor 20 informs of the end of the transaction by using the second touch panel 32 or the like. When the check-out processing at the commodity registration machine 10 is normally terminated, the user does not need to operate the check-out machine 12 and may just exit the store or the like.

Here, regarding the check-out processing at the commodity registration machine 10, the user may be able to select whether or not to print a receipt on which information regarding a settlement result and the like are printed. For example, the processor 20 displays the instruction key for instructing whether or not to print a receipt on the second touch panel 32. If an instruction to omit the receipt is made by the instruction key, the processor 20 omits printing of the receipt showing a result of the settlement processing.

When the check-out processing using the electronic payment at the commodity registration machine 10 is normally terminated, the processor 20 sends information indicating the normal end of the check-out processing with respect to the registration information corresponding to this transaction ID, to the store computer 14. With this, in the entire transaction system, the series of transaction processing corresponding to this transaction ID is also terminated.

Figure 7:
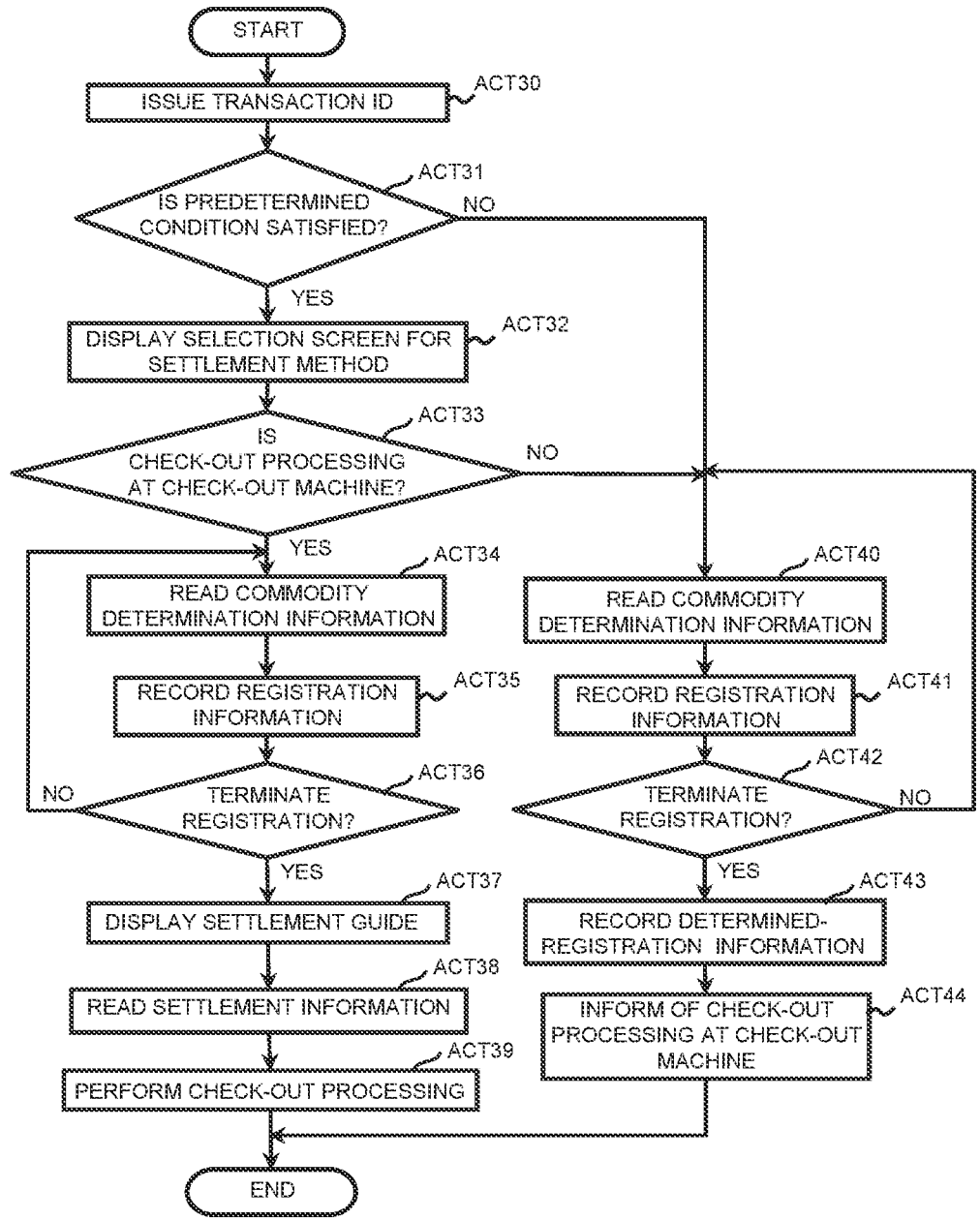
FIG. 7 is a flowchart showing a second operation example of the commodity registration machine in the transaction system according to the embodiment.

FIG. 7 is a flowchart showing a second operation example of the commodity registration machine 10 according to this embodiment. In ACT30 of FIG. 7, after the instruction to start the registration processing is accepted, the processor 20 of the commodity registration machine 10 issues the transaction ID, which is transaction identification data specific to the commodity transaction at this time. The transaction ID is similar to that described in the first operation example, for example.

In the second operation example, the processor 20 determines whether or not to perform check-out processing at the commodity registration machine 10 before the commodity registration processing is started. That is, in ACT31, the processor 20 determines whether or not the predetermined condition for permitting the check-out processing at the commodity registration machine is satisfied. Unlike the first operation example, the processor 20 determines whether or not the predetermined condition for permitting the check-out processing at the commodity registration machine is satisfied, in other words, whether or not the check-out processing at the commodity registration machine 10 is selectable before the commodity registration processing is started. In the second operation example, the processor 20 determines whether or not the check-out processing at the commodity registration machine 10 is possible on the basis of the information acquired before the commodity registration.

For example, the processor 20 determines whether or not the check-out processing at the commodity registration machine 10 is possible in accordance with an operation made by the checker 2. In this case, for example, the processor 20 determines that the check-out processing at the commodity registration machine 10 is possible if the checker 2 permits the check-out processing at the commodity registration machine 10 through the first touch panel 27 or the keyboard 26.

Further, the processor 20 may determine whether or not the check-out processing at the commodity registration machine 10 is possible in a manner that depends on activation states of the check-out machines 12. For example, when the two check-out machines 12 corresponding to the commodity registration machine 10 are performing check-out processing, the processor 20 permits the check-out processing at the commodity registration machine 10. Further, the processor 20 may detect a commodity placed on the check-out counter 5 through a sensor and may determine whether or not the check-out processing at the commodity registration machine 10 is possible in accordance with a detection result of the commodity.

If the processor 20 determines that the check-out processing at the commodity registration machine 10 is selectable (YES in ACT31), in other words, if the processor 20 determines to permit the check-out processing at the commodity registration machine 10 before the commodity registration processing is started, the processing of the processor 20 proceeds to ACT32. In ACT32, the processor 20 displays the settlement selection screen for selecting a settlement method to be used for check-out processing at the commodity registration machine 10 on the second touch panel 32. The settlement selection screen is a screen similar to that described in the first operation example, for example. Next, in ACT33, the processor 20 determines whether or not the check-out processing at the commodity registration machine 10 is selected via the settlement selection screen.

On the other hand, if the processor 20 determines that the check-out processing at the commodity registration machine 10 is not selectable (NO in ACT31), in other words, if the processor 20 determines not to permit the check-out processing at the commodity registration machine 10 before the commodity registration processing is started, the processing of the processor 20 proceeds to ACT40. Further, if the check-out processing at the commodity registration machine 10 is not selected via the settlement selection screen (NO in ACT33), in other words, the check-out processing at the check-out machine 12 is selected, the processing of the processor 20 proceeds to ACT40. In ACT40 to ACT44, the processor 20 performs processing for performing commodity registration processing and the check-out processing at the check-out machine 12. Here, the processing in ACT40 to ACT42 and in ACT43 to ACT44 are processing similar to ACT11 to ACT13 and ACT20 to ACT21 described in the first operation example, for example.

Further, if one of the settlement methods to be used for check-out processing at the commodity registration machine 10 is selected via the settlement selection screen (YES in ACT33), the processing of the processor 20 proceeds to ACT34. In ACT34 to ACT36, the processor 20 determines the settlement method to be used for the check-out processing at the commodity registration machine 10 in accordance with selection of the settlement method and performs commodity registration processing. Here, the processing in ACT34 to ACT36 is processing similar to ACT11 to ACT13 described in the first operation example, for example.

If the commodity registration is terminated in a state in which the settlement method at the commodity registration machine 10 is determined (YES in ACT36), the processing of the processor 20 proceeds to ACT37. In ACT37 to ACT39, the processor 20 performs check-out processing according to the selected settlement method. Here, the processing of ACT37 to ACT39 is processing similar to ACT17 to ACT19 described in the first operation example, for example.

Figure 8:
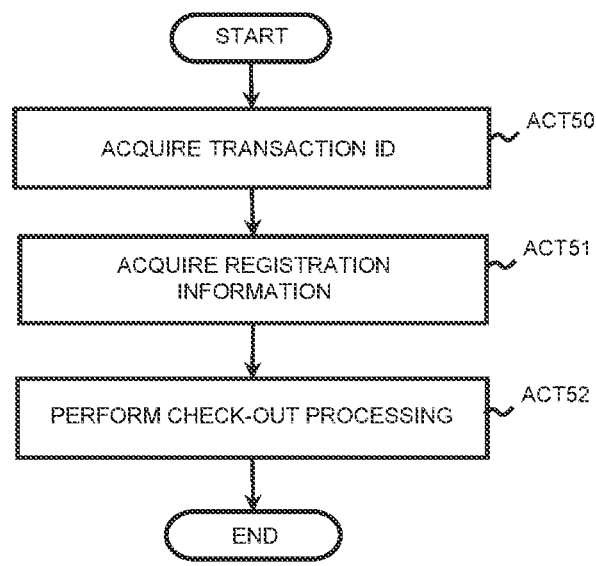
FIG. 8 is a flowchart showing an operation example of the check-out machine in the transaction system according to the embodiment.

Next, the check-out processing in the check-out machine 12 will be described. FIG. 8 is a flowchart showing the check-out processing in the check-out machine 12. If the check-out processing of the commodities registered by the commodity registration machine 10 is performed by the check-out machine 12, the user moves to the check-out machine 12. Then, the user himself/herself performs an operation for the check-out processing in the check-out machine 12. If the transaction ID issued by the commodity registration machine 10 is necessary for the check-out processing at the check-out machine 12, the user inputs the transaction ID issued by the commodity registration machine 10 in the check-out machine 12 that performs check-out processing. The processor 40 of the check-out machine 12 is held in a stand-by state until the processor 40 detects a user's operation. Then, when the touch panel 46 accepts an input of the transaction ID from the user under the stand-by state, the processor 40 acquires the transaction ID input by the user's operation in ACT51 of FIG. 8.

For example, the user inputs the transaction ID after making an instruction to start the check-out processing on the touch panel 46. When detecting the instruction to start the check-out processing, the processor 40 accepts the input of the transaction ID on the touch panel 46 and acquires the transaction ID input into the touch panel 46. Further, the transaction ID may be input by the two-dimensional code indicating the transaction ID printed on the receipt being read through the scanner 45. In this case, the processor 40 acquires the transaction ID which is a result of reading the two-dimensional code by the scanner 45.

It should be noted that the transaction system may omit the user's input of the transaction ID at the check-out machine 12 in accordance with the practical configuration. For example, in the arrangement example shown in FIG. 2, the two check-out machines 12 are associated with the one commodity registration machine 10. With such a configuration, the checker 2 may specify either one of the two check-out machines 12 and the user's input of the transaction ID may be omitted in the check-out machine 12 specified by the checker 2. In this case, the check-out machine 12 specified by the checker 2 may acquire the registration information of each commodity corresponding to the transaction ID of this transaction from the store computer 14 or directly from the commodity registration machine 10.

When the processor 40 acquires the transaction ID, in ACT51, the processor 40 acquires the registration information corresponding to the acquired transaction ID. For example, the processor 40 sends the store computer 14 to the acquired transaction ID. The processor 40 acquires the registration information corresponding to the sent transaction ID from the store computer 14. The store computer 14 sends the registration information corresponding to this transaction ID stored in the storage device to the check-out machine 12 in accordance with an inquiry based on the transaction ID from the check-out machine 12. Further, for example, if the registration information is stored in the storage device of the commodity registration machine 10, the processor 40 may acquire the registration information corresponding to the transaction ID from the commodity registration machine 10.

When acquiring the registration information corresponding to the transaction ID, in ACT52, the processor 40 performs check-out processing by settling the payment based on the acquired registration information. For example, the processor 40 causes the touch panel 46 to display a list of information related to the registered commodities (commodity names, amounts, sub-total amounts, and the like) as the objects to be subjected to check-out processing on the basis of the acquired registration information. The user checks the list of the information related to the commodities displayed on the touch panel 46 and performs an operation for settling the payment.

For example, for performing cash payment, the user specifies the cash payment on the touch panel 46. After that, the user inserts cash such as a coin and a bill into an insertion slot of the cash processing machine 47. The user inserts cash necessary for payment into the cash processing machine 47 in accordance with the payment displayed on the touch panel 46. In this case, the processor 40 processes the coin(s) and/or bill(s) inserted by the user by using the cash processing machine 47 and displays the inserted amount, change, and the like on the touch panel 46. The user checks information displayed on the touch panel 46. The processor 40 settles the payment on the basis of the amount inserted by the user. Then, the processor 40 performs settlement by causing the cash processing machine 47 to output the change and the like.

Further, for settling the payment by a payment card (credit card, debit card, electronic money card, prepaid card, portable terminal, or the like), the user specifies the card payment on the touch panel 46. After that, the user presents (inserts) the card to be used for check-out processing to/into the card reader/writer 50. The processor 40 performs authentication processing (e.g., password input and the like) with respect to the card presented by the user in a manner that depends on needs and performs processing of settling the payment by that card.

When the settlement of the payment is normally terminated, the processor 40 causes the printer 49 to output a receipt on which the settlement result is printed and terminates the check-out processing with respect to the one transaction (one user). When the check-out processing is terminated, the processor 40 sends a result of the check-out processing based on this transaction ID to the store computer 14. With this, when the check-out processing at the check-out machine 12 is terminated, the transaction system terminates the series of transaction processing corresponding to this transaction ID.

As described above, in the system in which commodity registration processing is performed at the commodity registration machine and check-out processing is performed at the check-out machine different from the commodity registration machine, the transaction system (semi-self check-out machine) according to this embodiment enables the check-out processing at the commodity registration machine to be performed if the predetermined condition is satisfied. With this, rather than simply providing the check-out processing at the commodity registration machine with respect to all transactions, rapid check-out processing at the commodity registration machine can be provided only to the user who satisfies the predetermined condition. Thus, the entire transaction system is enabled to perform an operation in which the transaction processing can be smoothly performed.

Further, the commodity registration machine of the transaction system (semi-self check-out machine) according to this embodiment provides a guide indicating that the check-out processing can be performed at the commodity registration machine if the predetermined condition is satisfied. Then, if the check-out processing at the commodity registration machine is selected, the commodity registration machine provides the check-out processing at the commodity registration machine. With this, the check-out processing at the commodity registration machine can be provided to the user who satisfies the predetermined condition after the guide indicating that the check-out processing at the commodity registration machine can be performed is provided, and efficient transaction processing can be realized.

Further, the commodity registration machine of transaction system (semi-self check-out machine) according to this embodiment makes the check-out processing at the commodity registration machine selectable to the user whose number of commodities is smaller than the predetermined number. With this, rapid check-out processing at the commodity registration machine can be provided to a user having a small number of commodities to be subjected to the check-out processing. Thus, the entire transaction system also can smoothly perform transaction processing.

Further, the commodity registration machine of transaction system (semi-self check-out machine) according to this embodiment makes the check-out processing at the commodity registration machine selectable to a user who needs to pay an amount smaller than a predetermined amount in the check-out processing (settlement). With this, rapid check-out processing at the commodity registration machine can be provided to the user who needs to pay a small amount in the check-out processing. Thus, the entire transaction system also can smoothly perform transaction processing.

Further, the commodity registration machine of transaction system (semi-self check-out machine) according to this embodiment makes the check-out processing at the commodity registration machine selectable to a user if many shoppers are waiting in front of the check-out machine. With this, rapid check-out processing at the commodity registration machine can be provided to the user if many shoppers are waiting in front of the check-out machine. Thus, the entire transaction system also can smoothly perform transaction processing.

Further, the transaction system (semi-self check-out machine) according to this embodiment makes the check-out processing according to the electronic payment at the commodity registration machine selectable if the predetermined condition is satisfied. With this, if the user who satisfies the predetermined condition wishes to perform electronic payment, rapid check-out processing at the commodity registration machine can be provided. Thus, the entire transaction system is enabled to perform an operation in which the transaction processing can be smoothly performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity registration machine comprising:
a scanner configured to read commodity determination information about a commodity to be registered for check-out processing in a commodity transaction;
a first input device by which an instruction to start registration processing can be input; and
a processor configured to:
after the input of the instruction to start registration processing by the first input device, generate registration information according to the commodity determination information read by the scanner, and determine whether or not a predetermined condition for permitting the check-out processing by the commodity registration machine is satisfied, the predetermined condition including:
a condition that a total number of commodities to be registered for the check-out processing is smaller than a predetermined number, or
a condition that a payment for the check-out processing is smaller than a predetermined amount, and
permit the check-out processing to begin on the commodity registration machine when the predetermined condition is satisfied.

2. The commodity registration machine according to claim 1, further comprising:
a storage device, wherein
the processor is further configured to:
upon the input of the instruction to start registration processing, issue transaction identification data for managing the commodity transaction, and
store in the storage device the generated registration information in association with the issued transaction identification data.

3. The commodity registration machine according to claim 1, further comprising:
a communication device configured to communicate with a check-out machine or an external computer to be connected to the check-out machine; and
a second input device by which one of the commodity registration machine and the check-out machine can be selected to perform the check-out processing.

4. The commodity registration machine according to claim 3, wherein
the second input device is a touch display, and
the processor is further configured to, when the predetermined condition is satisfied, cause the touch display to display a selection screen by which one of the commodity registration machine and the check-out machine can be selected to perform the check-out processing.

5. The commodity registration machine according to claim 3, further comprising:
a reader configured to read electronic payment information for performing electronic payment from a medium, wherein
the processor is further configured to, when the commodity registration machine is selected by the second input device, perform the check-out processing using the electronic payment information read by the reader.

6. The commodity registration machine according to claim 3, wherein the first input device is a touch display that faces a first direction, and the second input device is a touch display that faces a second direction opposite to the first direction.

7. The commodity registration machine according to claim 3, wherein the second input device faces the second direction in which a passage for a customer is located.

8. The commodity registration machine according to claim 3, wherein the processor is further configured to enable the second input device to receive an input of the selection when the predetermined condition is satisfied.

9. The commodity registration machine according to claim 8, wherein the processor is further configured to perform the check-out processing on a basis of the generated registration information when the commodity registration machine is selected to perform the check-out processing by the second input device.

10. The commodity registration machine according to claim 9, wherein the processor is further configured to cause the communication device to send the generated registration information to the external computer or the check-out machine when (i) the predetermined condition is not satisfied, or (ii) the predetermined condition is satisfied and the check-out machine is selected to perform the check-out processing by the second input device.

* * * * *